April 8, 1947.    D. ROSENSTON ET AL    2,418,727
INDICATOR
Filed March 27, 1944
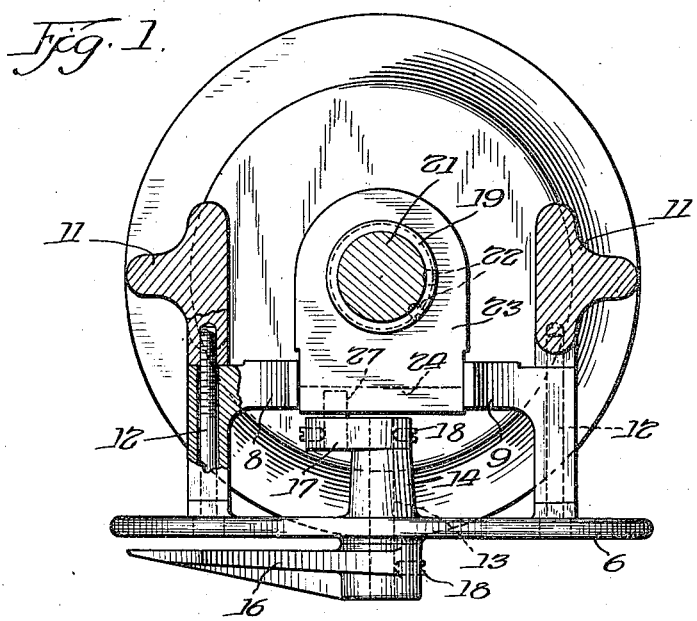
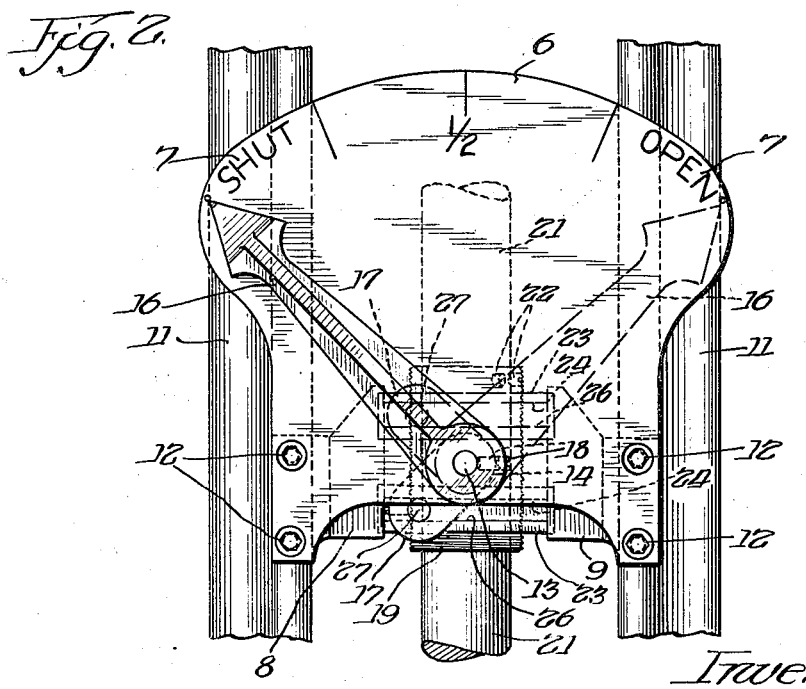
Inventors:
David Rosenston, &
Chester W. Yant:
By: Joseph O. Lange Atty.

Patented Apr. 8, 1947

2,418,727

UNITED STATES PATENT OFFICE 2,418,727

INDICATOR

David Rosenston, Chicago, and Chester W. Yant, Westchester, Ill., assignors to Crane Co., Chicago, Ill., a corporation of Illinois Application March 27, 1944, Serial No. 528,320

4 Claims. (Cl. 116—125)

This invention relates to improvements in indicators for rising and non-rising stem valves or the like useful for indicating the position of a valve closure member at and between its open and closed positions, and has for an important object the provision of an indicator which is simple in operation, inexpensive in construction and which will not readily get out of order.

This invention further contemplates the provision of an indicator in which the hand and face thereof are of sufficient size and form to be readily observed from a distant point.

This invention further contemplates the provision of an indicator in which the rotational movement of a non-rising valve stem or the like causes pivotal movement of an indicator hand for indicating on a relatively large indicator face the position of a valve closure member.

This invention embodies other novel features, details of construction and arrangement of parts which are hereinafter set forth in the specification and claims and illustrated in the accompanying drawing, forming part thereof, wherein:

Fig. 1 is a top plan view showing an indicator embodying features of this invention, the indicator being shown as applied to the yoke arms of a non-rising stem valve for indicating the position of a valve closure member with respect to its body seats.

Fig. 2 is a front elevational view of same.

Referring now to the drawing for a better understanding of this invention, the indicator is shown comprising a face plate 6 having suitable markings 7 provided thereon. The face plate and a pair of guide members 8 and 9 are secured to yoke arms 11 of a non-rising stem valve by means of screws 12. A shaft 13 is journaled in a bearing 14 on the face plate to receive a relatively long indicator hand 16 and a relatively short lever arm 17 which are secured thereto by set screws 18.

An externally threaded sleeve 19 is secured to a valve stem 21 by means of set screws 22 for threaded engagement with an internally threaded actuator 23. Formed on the actuator and extending transversely to the longitudinal axis of the valve stem 21 are provided a pair of cam surfaces 24 and 26 for engagement with a pin 27 secured on the lever arm 17.

In the operation of the indicator thus described for indicating the position of a closure member of a non-rising stem valve, counterclockwise rotation of the valve stem 21 acts through the threaded sleeve 19 to raise the actuator which, in turn, acts through the cam surfaces 24 and 26, pin 27, lever arm 17 and shaft 13 to pivot the indicator hand clockwise toward the marking 7 indicating open position of the closure member. Clockwise rotational movement of the valve stem causes downward movement of the actuator and counterclockwise pivotal movement of the indicator hand 16. The latter member is shown in the open position in dot and dash lines.

While this invention has been shown in but one form and as applied to a non-rising stem valve it is obvious to those skilled in the art that it is not so limited but is susceptible of various changes and modifications without departing from the spirit thereof or the scope of the appended claims.

We claim:

1. In an indicator, the combination with a stem journaled for rotational movement, of an actuator movable axially upon rotational movement of said stem, a face plate stationary with respect to said actuator, a pivot member mounted in said face plate, a relatively long indicator hand pivotally mounted on said face plate and a relatively short lever arm both connected to said pivot member, the said lever arm being operatively connected to said indicator hand, a pin therebetween and cam surfaces provided on said actuator for sliding engagement with said pin for pivotally moving the said indicator hand, the said pin being predeterminedly positioned relative to the number of turns of the said stem whereby the angular travel of the indicator hand remains constant.

2. In an indicator, the combination with a stem journaled for rotational movement, of an actuator movable axially upon rotational movement of said stem, a face plate stationary with respect to said actuator, a relatively long indicator hand pivotally mounted on said face plate, a relatively short lever arm operatively connected to said indicator hand, a pin cooperating with the said short lever arm, and cam surfaces provided on said actuator and disposed transversely to the longitudinal axis of said stem for sliding engagement with said pin for pivotally moving the said indicator hand.

3. In an indicator, the combination with a stem journaled for rotational movement, of an actuator threaded onto said stem for axial movement thereon, cam surfaces provided on said actuator and disposed transversely to the longitudinal axis of the stem, guide means for preventing rotational movement of the actuator, a face plate stationary with respect to said actuator and having markings thereon, a shaft journaled in said face plate, a relatively short lever secured to one end of said shaft for pivotal movement by said cam surfaces upon axial movement of said actuator, a pin located between the said cam surfaces and the said short lever to connect the latter member and the cam surfaces of the actuator whereby movement of the cam is communicated to the said short lever arm and a relatively long indicator hand secured to the other end of said shaft for registry with the markings provided on the said face plate.

4. In an indicator, the combination with a stem journaled for rotational movement, of an actuator threaded onto said stem for axial movement thereon, cam surfaces provided on said actuator and disposed transversely to the longitudinal axis of the stem, guide means for preventing rotational movement of the actuator, a face plate stationary with respect to said actuator and having markings thereon, a shaft journaled in said face plate, a relatively short lever secured to one end of said shaft for pivotal movement by said cam surfaces upon axial movement of said actuator, a relatively long indicator hand secured to the other end of said shaft for registry with the markings provided on the face plate, and means for connecting the guide means to the said face plate comprising a pin positioned between the said cam surfaces and the said short lever.

DAVID ROSENSTON.
CHESTER W. YANT.

REFERENCES CITED

The following references are of record in the file of this patent:

UNITED STATES PATENTS

| Number | Name | Date |
|---|---|---|
| 630,278 | Wiley | Aug. 1, 1899 |
| 819,185 | Vincent | May 1, 1906 |
| 1,131,885 | Wingett | Mar. 16, 1915 |